United States Patent [19]

Angell, Jr. et al.

[11] Patent Number: 4,804,509
[45] Date of Patent: Feb. 14, 1989

[54] HOT-MELT PREPREG TOW PROCESS

[75] Inventors: Richard G. Angell, Jr.; Michael J. Michno, Jr., both of Bridgewater; John M. Konrad; Kenneth E. Hobbs, both of Middlesex, all of N.J.

[73] Assignee: Amoco Corporation, Chicago, Ill.

[21] Appl. No.: 943,250

[22] Filed: Dec. 17, 1986

[51] Int. Cl.$^4$ .................... B29B 7/12; B29C 35/16
[52] U.S. Cl. .................... 264/136; 264/237; 264/280; 264/348; 427/209; 427/211; 427/398.2; 427/428
[58] Field of Search .............. 264/70, 136, 237, 257, 264/280, 324, 348, 174; 427/209, 211, 428, 434.6, 398.2; 425/92, 93, 102, 200; 118/420, 56; 156/441

[56] References Cited

U.S. PATENT DOCUMENTS

| | | | |
|---|---|---|---|
| 3,844,822 | 10/1974 | Ross et al. | 117/119.6 |
| 3,874,833 | 4/1975 | Ancker | 425/115 |
| 3,908,042 | 9/1975 | Heissler et al. | 427/172 |
| 4,076,864 | 2/1978 | Wallstein | 427/209 |
| 4,211,818 | 7/1980 | Ackldey | 428/367 |
| 4,358,481 | 11/1982 | Wallstein | 427/211 |
| 4,387,118 | 6/1983 | Shelton | 427/176 |
| 4,439,387 | 3/1984 | Hawley | 264/108 |
| 4,530,733 | 7/1985 | Doellinger et al. | 156/441 |
| 4,549,920 | 10/1985 | Cogswell et al. | 156/181 |
| 4,588,538 | 5/1986 | Chung et al. | 264/136 |
| 4,643,126 | 2/1987 | Wilkinson et al. | 118/405 |
| 4,728,387 | 3/1988 | Hilakos | 156/441 |

Primary Examiner—Jan H. Silbaugh
Assistant Examiner—Hubert C. Lorin
Attorney, Agent, or Firm—Richard J. Schlott; William H. Magidson; Ralph C. Medhurst

[57] ABSTRACT

Process for producing resin-impregnated fiber tow or strand in the form of prepreg tape which includes unique coating wheels for surface-coating the strand with molten, flowable resin and a kneading section to work the strand and disperse the molten resin uniformly among and between the individual fibers of the strand. The strand, after chilling, has good dimensional stability and is useful as prepreg in forming composite structures.

5 Claims, 2 Drawing Sheets

PREPREG. TOW LINE

PREPREG. TOW IMPREGNATION SECTION

HOT-MELT PREPREG TOW PROCESS

BACKGROUND OF THE INVENTION

This invention relates to a process for impregnating reinforcing fibers. More particularly, the invention relates to a solvent-free method for impregnating reinforcing fiber yarn or tow with a synthetic resin and to an apparatus for producing resin-impregnated tow.

Composites comprising reinforcing fiber imbedded in a resin matrix are well-known. Both organic and inorganic fiber may be used for making such composites, separately and in combination. Woven fabric and continuous fiber strand in the form of yarn, tow, roving, tape and even monofilament have utility in such applications, and a wide variety of analogous compositions based on chopped fiber are also used for producing molded goods. One of the common methods for making composites employs continuous fiber strand in the form of flat tape or ribbon, preimpregnated with a curable resin. The processes used currently for impregnating the fiber strand are generally wet processes that employ low viscosity liquid resins, or solutions and dispersions of more highly viscous liquid resins and solid polymers. Wet processes are relied upon in part because such methods tend to ensure a more thorough penetration of the fiber bundle. Whether the wet-impregnated strand is to be used immediately in a filament winding operation or stored in the form of prepreg for later fabrication, it is necessary that any volatile components such as residual solvent be removed, usually by application of heat and/or vacuum. The presence of even minor amounts of residual solvent or other volatiles in the prepreg tends to produce voids and similar defects during the subsequent curing step which threaten the integrity of the composite. Removing these volatiles without significantly advancing the degree of cure in a thermoset resin is difficult.

Melt-coating and extrusion-coating processes for applying molten resin to the surfaces of strand and filament are also well known, as typified by wire and cable coating processes, as well as by calendering operations for applying coatings for laminating webs such as those disclosed in U.S. Pat. No. 3,874,833. Coating processes have also been modified for impregnating use in filaments and strand. Generally thermoplastic resins which will not become thermally cured when heated are preferred for use in these processes. Methods and apparatus designs are also available for directly imbedding strand into a thermoplastic resin matrix, including those shown for example in U.S. Pat. No. 4,439,387. Fiber-reinforced structural shapes comprising fibers imbedded in a thermosetting resin matrix may be produced by pultrusion processes in which fiber and thermosetting liquid resin are combined and pulled through a die to give continuous shaped articles such as I-beams, channels, bars and rods. Curing is accomplished thermally during the shaping operation.

Recently, methods for impregnating fiber strand with thermosetting resins at a high rate with control of fiber resin content have become known. For example, in the process shown in U.S. Pat. No. 3,908,042, resin is applied sequentially to each side of a fiber strand by contacting rolls or kiss rolls carrying a resin film of controlled thickness. The roll is partly immersed in a bath of heated resin, acquiring a surface coat of resin as it rotates. The thickness of the resin film on the surface of the kiss roll, and thereby the amount of resin applied to the strand, is controlled by means of a doctor blade placed in contact with the roll ahead of the point of contact with the fiber strand. Conventional alternatives for controlling the amount of resin applied to a fiber strand have included the use of dies for wiping the excess resin from the strand as it exits a resin bath. See, for example, U.S. Pat. No. 4,211,818. Removing excess resin from the strand by a wiping operation is generally difficult, and made more difficult when strand formed of very fine, frequently brittle fiber such as carbon is used. Broken fibers, termed fuzzies or fuzz balls, tend to form and accumulate at the die face and break the fiber strand. Additionally, applying the resin either by means of a kiss roll or by immersion in a resin bath requires that a substantial quantity of resin be heated and maintained at an elevated temperature, increasing the likelihood that the resin will be advanced or cured. Premature curing impairs impregnation because of increased resin viscosity, and produces defective and unacceptable prepreg.

A practical method for impregnating reinforcing fiber yarn or tow with a resin uniformly and at a high rate is therefore still needed by the composites industry. Problems created by the use of solvents and by heating thermoset resins for extended periods as is currently practiced would be reduced or avoided. More accurate control over the resin content, the quality and the uniformity of the resulting prepreg would be a substantial advance in this art.

SUMMARY OF THE INVENTION

The present invention is an improved process and apparatus for preparing impregnated reinforcing fibers wherein the fiber strand is impregnated by being first coated at a high rate with a controlled amount of heated, solvent-free, thermosetting or thermoplastic resin, worked to thoroughly distribute the resin into the strand, then chilled to set the impregnated fiber strand as a tape or band having a controlled, predetermined cross-section. Extended heating times for the resin are avoided, and a high degree of uniformity of resin distribution within the fiber strand is accomplished. The means for regulating the coating thickness and thus the degree of resin impregnation may be accurately controlled over a wide range without contributing to fiber breakage and accumulation of fuzzies.

The apparatus used in the practice of the invention comprises a working section, an impregnation section and a chiller section. A complete impregnating line will also include a fiber supply or strand payout section, the resin delivery system, a winder section and appropriate quality control devices and instrumentation.

Fiber yarn or tow is generally compact and circular in cross-section as supplied. It is difficult to uniformly impregnate the strand rather than merely coating the surface or outer layers of the strand. In the practice of this invention, the fibers of the strand are first spread transversely to form and define a tape or band, thinned in cross-section to afford better access by resin during the impregnating step. The band is impregnated by first coating the surfaces with molten resin using coating wheels. The amount of resin applied to each surface is controlled by sequentially doctoring the molten resin directly onto each surface of the band. The coated band is then further worked by kneading rolls to force the resin between the individual fibers, distributing the resin uniformly into the band. The resin-impregnated band is then passed through nip rolls to further spread the strand, widening and flattening or thinning the resulting tape. During these kneading operations, the resin is kept molten by maintaining a heated environment surrounding the strand, the coating rolls and the kneading rolls. The tape or band then is formed to its final cross-section and quickly cooled, making the resin stiff or semi-solid and giving the tape a fixed cross-section. These operations are accomplished over a short span of the tape, continuously and at a high rate, so that the resin is maintained at elevated temperatures only briefly. The coating section requires only a very small amount of molten resin, which is rapidly consumed and continuously replenished by pumping from a small reservoir of heated resin.

DETAILED DESCRIPTION OF THE PREFERRED EMBODIMENT

Figure 1:
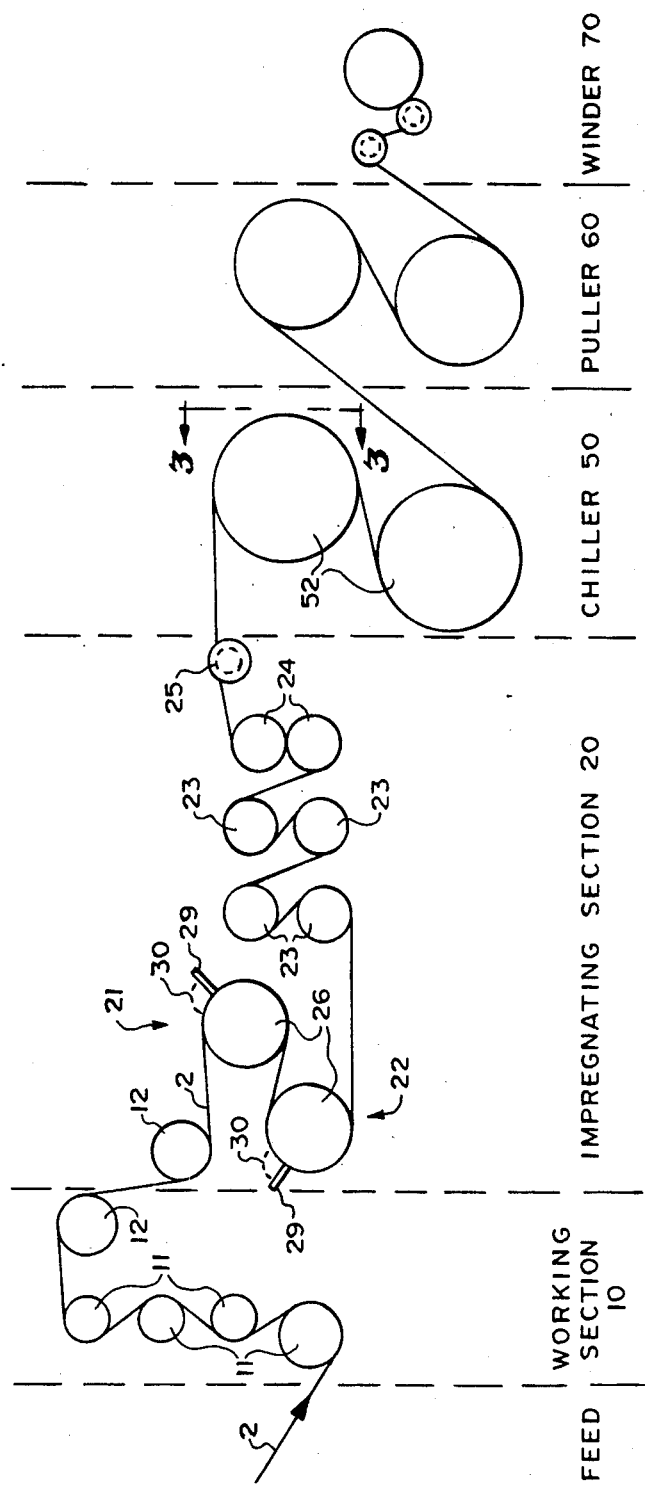
FIG. 1 is a flow sheet of the equipment used to manufacture the resin impregnated tow.

In the apparatus of this invention, as shown in FIG. 1, the strand (3) passes first through a working section (10) comprising a series of rollers (11) to work and spread the strand, separating the individual fibers and giving the strand a generally flattened and thinned crosssection. The highly-polished rollers (11) are disposed along the line of strand travel, with strand wrap angles in the range of from about 30° to 180°. The degree of working and the amount of spreading that results will vary depending upon the thickness of the strand, the number and gauge of the individual fibers and the kind of organic and inorganic fibers that make up the strand.

The fiber strand, now flattened in cross-section, exits the working section (10) and passes over guide rolls (12) and into the impregnating section (20). As will be seen from FIG. 2, impregnating section (20) comprises two coating rolls (21) and (22), kneader rolls (23), nip rolls (24) and band control (25) components. The coating rolls (21) and (22), or rolling dies, each comprise a smooth, highly polished roll (26) contacted by a coating blade or doctor blade (29). Unlike prior art devices, the doctor blade (29) and roller (26) cooperate, forming a rolling die having die aperture (28) through which the flattened fiber strand (2) passes, becoming coated on the surface nearest the doctor blade (29). The strand is coated in two operations; in the first rolling die (21), resin (30) is wiped or doctored directly onto the first face (3) of the strand (2). The strand (2) then passes to a second such rolling die (22), where the strand (2) is coated on the second face (4) in the same manner.

A rolling bank of resin (30) is maintained in each rolling die area by means of the resin supply system. Generally the supply system may be described as including at least one pump means (40) for moving the viscous resin from a heated reservoir (41) into the area adjacent to die opening (28). The supply lines and pump means will be supplied with heating means to maintain the resin in a molten state. The pumping is controlled at a rate which will replace the resin as it is consumed while maintaining the rolling resin bank at the minimum effective level.

The thickness of the coating is controlled by the die gap or aperture (28) between the roller (26) and the doctor blade (29), and is adjustable by means of adjusting screws (not shown) either manually or automatically in response to quality control measurements. Flow of the resin into and through the narrowing die aperture (28) produces a substantial increase in hydrostatic pressure by processes analogous to those described in U.S. Pat. No. 3,765,817 for calendering operations. The hydrostatic pressure, which varies with the resin viscosity and flow rate or coating speed, causes some penetration of resin between the individual fibers at the strand surface and ensures good adhesion of the resin coating as it exits the coating roll.

The strand exiting the coating rolls may be described as a coated band or tape. Impregnating the fibers requires that the resin be forced uniformly into the strand, thus penetrating between the individual fibers. In order to accomplish impregnation of the fibers, the strand (2) then passes through kneader rolls (23) to further work the strand. The kneader rolls (23) are disposed along the line of strand travel in a manner to impart considerable working to the strand; as shown, six rolls are employed, located to provide wrap angles greater than 30°, and preferably as great as 180°, or even greater. The kneader rolls will be constructed of material which will not stick to the resin-coated strand, such as, for example, Teflon or Teflon-coated metal. The surfaces of these rollers, as with all rollers used in the apparatus, will be finished to a high degree of smoothness, and generally greater than 8 micro inch. The strand, exiting the kneader rolls, enters the nip of a 2-roll compression section (24) which further works and spreads the strand into a wide, flat cross-section. The compression rolls (24) are of construction similar to the kneader rolls. The compression roll pressure may be maintained by strand tension, or by means of jack screws (not shown) where heavy pressures are needed to produce very wide flat tow.

The resin portion of the impregnated tow is maintained in a molten condition while passing through the kneader rolls (23) and compression rolls (24) by applying external heating, such as by use of radiant heaters or heated air. The coating area may also be enclosed as a further aid to maintaining an elevated temperature environment.

Figure 3:
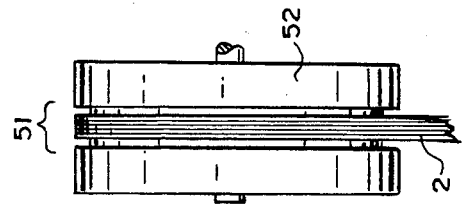
FIG. 3 is an edge view of a chill roll taken along line 3—3 of FIG. 1, showing the edge gap of the chill roll.

The strand, now impregnated with resin uniformly as a result of the working, passes to the chiller (50) to accomplish a rapid reduction of the resin temperature, thus stiffening the resin and freezing the strand into a final configuration. The final configuration or strand cross-section will be determined in part by the geometry of the gap (51) or groove in the surface of the chiller roll (52), designed to receive the impregnated strand as shown with greater clarity in FIG. 3. Generally, the use of a gap (51) having a rectangular u-shape results in a flat strand having rectangular cross-section, the strand width being defined to a first rough dimension by the pressure applied to the nip rolls (24), then to a final dimension by the gap (51). The strand is precisely centered in the gap (51) by the band control wheel (25). The chiller rolls (52), which may be constructed of metal and coated with, for example, Teflon to avoid sticking, are maintained at low temperature, generally in the range −20° to 30° C., by cooling means such as, for example, by circulating a chilled fluid through closed internal passages within the chiller roll. Cooling may be further aided if desired by circulating chilled air over the external surfaces of the wheel and the strand.

Measurement and control of the resin content of the strand may be accomplished by a variety of methods. Conveniently, a conventional Gamma ray backscatter gage, appropriately calibrated, affords accurate measurement of resin content to within ±1%. The output of such a device may be applied to control resin and strand feed rates, as well as the coating thickness as determined by blade gap in the rolling dies.

Strand feed is accomplished by means of a high torque puller (60). As shown, the puller (60) comprises a 2-roll device having silicone rubber surfaces. These and similar conventional pullers are suitable for these purposes, particularly where torque and speed are adjustable over a wide range. The strand exiting the puller will normally be taken up in a winder (70), and any of a variety of conventional textile fiber winders may be employed for this purpose.

The practice of the invention will be better understood by considering the following example, provided by way of illustration and not in limitation of the invention.

EXAMPLE

Figure 2:
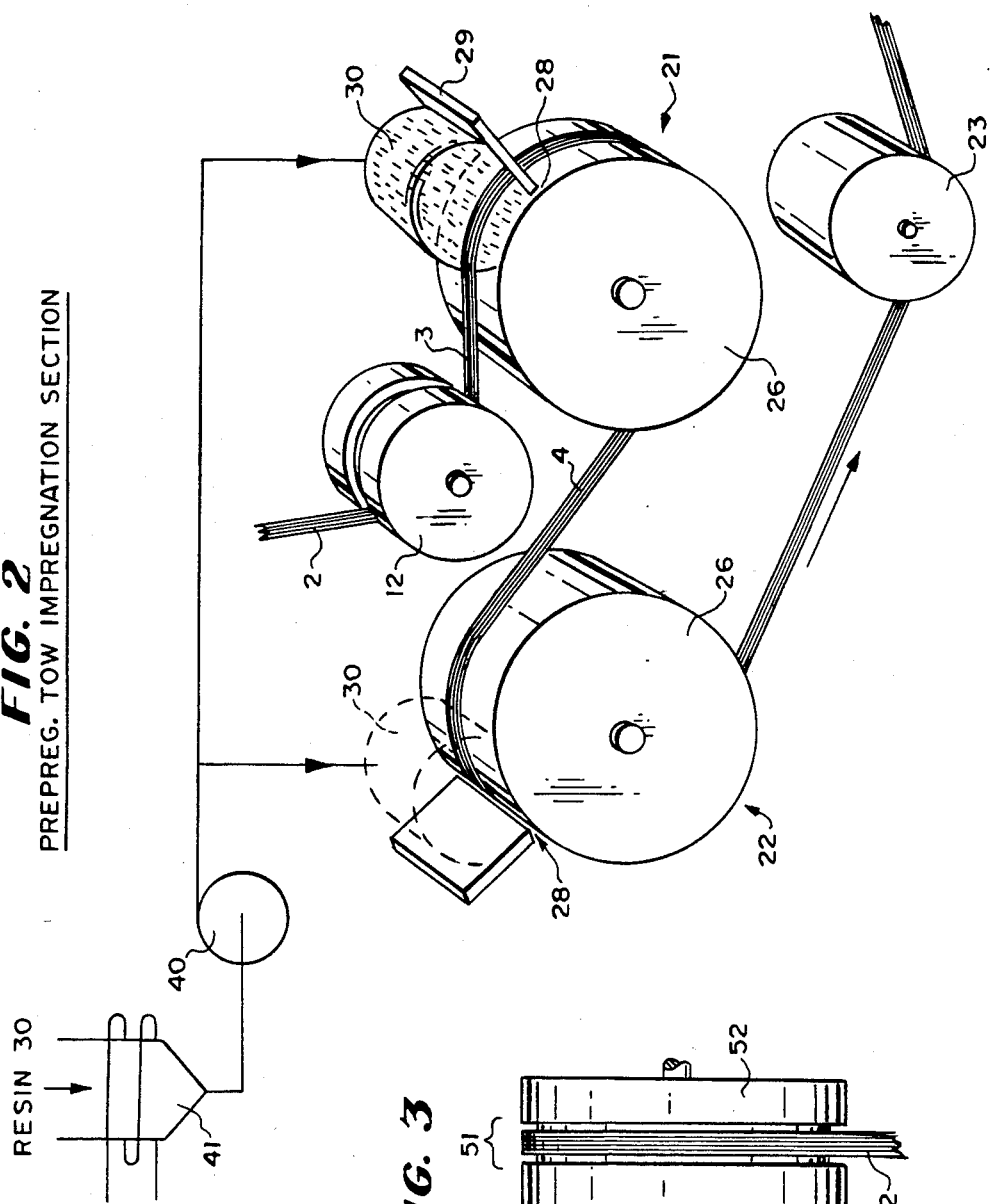
FIG. 2 is a perspective drawing of the resin impregnating section of the process of FIG. 1.

Apparatus configured generally as described herein and shown schematically in FIGS. 1 and 2 was used to impregnate 12,000 filament carbon fiber yarn with an epoxy resin and make prepreg tow 0.130 inches wide. The yarn was obtained from Amoco Performance Products, Inc. as Thornel ® T40 12K carbon fiber; the epoxy resin was ERLX 1908, obtained from the same source. Two rollers were used in the working section, placed to provide a wrap angle on each roller of approximately 160 degrees. The heated resin having a viscosity of about 2,500 centi poise at 65° C., was fed to the two coating rolls of the impregnating section by two heated pumps. The die gap was set at 0.005" for each roller die. The coated strand then passed through the kneader and the nip of the compression rolls, also maintained at 65° C. The coated strand was then configured using a chiller roll having a squared u-shaped groove or gap with a width of 0.130 inches, maintained at 30° F. The impregnated strand was chilled sufficiently passing through the chiller rolls to maintain dimensional stability while advancing through the puller and winder for placement on a shipping core. The puller, run at speeds in the range of 500 to 560 feet per minute, and the winder were conventional devices typical of those used in the fiber art. The initial roll or core of impregnated strand contained 19,020 feet of prepreg weighing 8.16 pounds with an average resin content of 30 weight percent. The next five rolls of prepreg produced in the run had average resin contents of 30, 29, 29, 29, and 30 percent, demonstrating the reproducibility of this process.

While the apparatus is described in terms of the production of flat, twist-free strand having a rectangular cross-section, it will be recognized that the flat strand exiting the impregnation section may be readily twisted or reshaped to form a strand having compact and even round or circular cross-section prior to chilling, for example, by use of a shaping groove or gap (51) with an appropriate cross-section and/or by eliminating the nip rolls and the strand-spreading that the nip rolls produce. For most prepreg applications, however, the flat strand configuration or tape is highly desirable.

We claim:
1. A process for preparing prepreg comprising the steps of:
    (a) conveying and moving lengthwise a continuous fiber strand;
    (b) engaging and working said strand with a plurality of roll means, spreading the fibers thereof transversely to form a band;
    (c) conveying said band continuously through rolling die means and coating the opposing faces of said band with molten, flowable solvent-free resin;
    (d) engaging the resin-coated band with a plurality of roll means while maintaining said resin in a molten state, thereby kneading the moving band and dispersing the molten resin between the fibers of the band, forming a resin-impregnated band;
    (e) conveying the resin-impregnated band continuously through the nip opening of a pair of counter-rotating compression roll means while maintaining the resin in a molten state, compressing said band and reducing the thickness thereof to form a resin-impregnated tape; and
    (f) engaging the resin-impregnated tape with chill roll means, thereby chilling said tape and forming a dimensionally-stable prepreg.

2. The process of claim 1, wherein said chill roll means includes groove means receiving said tape, whereby said tape is simultaneously shaped and chilled.

3. The process of claim 1 wherein the coating of said band is accomplished by continuously passing said band sequentially through the die apertures of two rolling die means, whereby molten resin is doctored onto a first face of said band, and thereafter molten resin is coated onto a second, opposing face of said band.

4. The process of claim 1 wherein said resin is thermosetting resin.

5. The process of claim 1 wherein said continuous fiber strand is a carbon fiber tow.

* * * * *